(12) United States Patent
Goodrich et al.

(10) Patent No.: US 11,623,810 B2
(45) Date of Patent: Apr. 11, 2023

(54) SLIT SHEET MATERIAL DISPENSING PAD (71) Applicants: David Paul Goodrich, Sedona, AZ (US); Lorne Herszkowicz, Thornhill (CA)

(72) Inventors: David Paul Goodrich, Sedona, AZ (US); Lorne Herszkowicz, Thornhill (CA)

(*) Notice: Subject to any disclaimer, the term of this patent is extended or adjusted under 35 U.S.C. 154(b) by 93 days.

(21) Appl. No.: 17/071,422

(22) Filed: Oct. 15, 2020

(65) Prior Publication Data
US 2021/0114791 A1 Apr. 22, 2021

Related U.S. Application Data (60) Provisional application No. 62/916,093, filed on Oct. 16, 2019.

(51) Int. Cl.
B42D 5/00 (2006.01)
B32B 3/28 (2006.01)
B32B 3/12 (2006.01)
B65D 81/03 (2006.01)
B32B 3/26 (2006.01)

(52) U.S. Cl.
CPC ............... B65D 81/03 (2013.01); B32B 3/12 (2013.01); B32B 3/266 (2013.01); B32B 3/28 (2013.01); B42D 5/002 (2013.01); B42D 5/003 (2013.01); B42D 5/005 (2013.01)

(58) Field of Classification Search
CPC .......... B42D 5/003; B42D 5/005; B32B 3/28; B32B 3/266; B32B 3/12
See application file for complete search history.

(56) References Cited

U.S. PATENT DOCUMENTS

| 741,878 | A | | 10/1903 | Bogart | |
|---|---|---|---|---|---|
| 756,013 | A | * | 3/1904 | Franklin | B42D 5/005 281/19.1 |
| 848,680 | A | | 4/1907 | Nelson | |
| 2,108,015 | A | * | 2/1938 | Kalish | B42D 5/008 281/29 |
| 2,367,608 | A | | 1/1945 | Ponnock | |
| 3,104,197 | A | | 9/1963 | Back et al. | |
| 3,220,116 | A | | 11/1965 | Freuler | |

(Continued)

FOREIGN PATENT DOCUMENTS

| CA | 1312889 C | 1/1993 |
|---|---|---|
| EP | 0 309 107 A2 | 3/1989 |

(Continued)

OTHER PUBLICATIONS

NL-8903135-A English Translation (Year: 1991).*

(Continued)

Primary Examiner — Kyle R Grabowski
(74) Attorney, Agent, or Firm — Studebaker & Brackett, PC (57) ABSTRACT A pad of a plurality of sheets of expandable slit paper is provided in which the paper expands in thickness when stretched to form expanded cells, wherein the sheets of expandable slit paper are bound together along a single edge and otherwise unbound together. In some embodiments, sheets of slit sheet material are removable for use of the slit sheet material for packing items or the like with the slit sheet material in an expanded state.

33 Claims, 7 Drawing Sheets (56) References Cited

U.S. PATENT DOCUMENTS

| | | | |
|---|---|---|---|
| 3,266,972 A | 8/1966 | Cramer | |
| 3,269,393 A | 8/1966 | Ackermann | |
| 3,778,324 A | 12/1973 | Lavigne | |
| 3,908,071 A | 9/1975 | Heim et al. | |
| 3,937,491 A | 2/1976 | Hilding | |
| 4,149,288 A | 4/1979 | Sendor et al. | |
| 4,590,109 A | 5/1986 | Holmberg | |
| 5,112,083 A | 5/1992 | Morrone | |
| 5,299,833 A | 4/1994 | Madole, Jr. | |
| 5,427,254 A * | 6/1995 | Knieriem | B42D 5/005 248/205.2 |
| 5,538,778 A | 7/1996 | Hurwitz et al. | |
| 5,667,135 A * | 9/1997 | Schaefer | A47G 23/0216 220/738 |
| 5,667,871 A * | 9/1997 | Goodrich | B31C 5/00 428/338 |
| 5,688,578 A | 11/1997 | Goodrich | |
| 5,782,735 A | 7/1998 | Goodrich et al. | |
| 5,948,494 A | 9/1999 | Levin | |
| 6,024,832 A | 2/2000 | Trani et al. | |
| 6,146,731 A | 11/2000 | Tanoto | |
| 6,458,447 B1 | 10/2002 | Cabell et al. | |
| 6,712,930 B2 | 3/2004 | Koivukunnas | |
| 7,175,731 B2 | 2/2007 | Hansen et al. | |
| 8,702,085 B2 | 4/2014 | Carter et al. | |
| 10,669,086 B2 | 6/2020 | Goodrich | |
| 2002/0060034 A1 | 5/2002 | Hollmark et al. | |
| 2007/0204572 A1 | 9/2007 | Nakagiri et al. | |
| 2007/0240841 A1 | 10/2007 | Trani et al. | |
| 2016/0067938 A1 | 3/2016 | Goodrich | |
| 2017/0341845 A1 * | 11/2017 | Mulvey | B65D 23/0892 |

FOREIGN PATENT DOCUMENTS

| | | | | |
|---|---|---|---|---|
| FR | 1263413 A * | 4/1960 | | |
| GB | 1 409 808 A | 10/1975 | | |
| NL | 8903135 A * | 7/1991 | | B42D 5/003 |
| WO | 84/02936 A1 | 8/1984 | | |
| WO | 98/57810 A1 | 12/1998 | | |

OTHER PUBLICATIONS

International Search Report and Written Opinion dated Jan. 19, 2021, issued in counterpart Application No. PCT/US2020/055719. (20 pages).

* cited by examiner

SLIT SHEET MATERIAL DISPENSING PAD

The present application is a non-provisional of U.S. Provisional Application No. 62/916,093, filed on Oct. 16, 2019, the entire disclosure of which application is incorporated herein by reference.

BACKGROUND

Field of the Invention

The preferred embodiments of the invention relate the use of sheets of slit sheet material removably supported on a support, which are removable for use of the slit sheet material for packing items or the like, and in some preferred embodiments to the use of sheets of slit sheet material that are mounted or adhered to a stable bottom pad or the like that can be fixed, e.g., non-permanently adhered, to a table or support for dispensing and packing items.

Description of the Background Art

There have been a number of devices to dispense rolls of expanded slit sheet material requiring a significant amount of slit sheet material to be wound on a roll to make the product economically viable.

SUMMARY

The preferred embodiments overcome shortcomings and/or other problems in the background art.

In some preferred embodiments, a plurality of sheets of slit sheet material are removably supported on a support. In preferred implementations, the sheets of slit sheet material are removable for use of the slit sheet material for packing items or the like. For example, the sheets can be individually removed and used to wrap and protect items or the like.

In some preferred embodiments, sheets of slit sheet material are mounted or adhered to a stable bottom pad or the like that can be fixed, e.g., non-permanently adhered, to a table or support for dispensing and packing items.

According to some preferred embodiments, a pad of a plurality of sheets of expandable slit paper is provided, said paper expanding in thickness when stretched to form expanded cells, wherein the sheets of expandable slit paper are bound together along a single edge and otherwise unbound together. In some embodiments, said expanded cells are hexagonal cells.

In some embodiments, each sheet of the plurality of sheets is provided with a score line proximate the region of the single edge, thereby facilitating the separation of each sheet from the pad of a plurality of sheets.

In some embodiments, at least one staple is applied to the pad of a plurality of sheets, and, in some embodiments, a plurality of staples are applied to the pad of a plurality of sheets. In some embodiments, each sheet of the plurality of sheets is provided with a score line proximate a region formed by the at least one staple, thereby facilitating the separation of each sheet from the pad of a plurality of sheets.

In some embodiments, a releasable adhesive is applied to each sheet in the region of the single edge. In some embodiments, an adhesive is applied to each sheet in the region of the single edge thereby binding together the plurality of sheets of expandable paper. In some embodiments, each sheet of the plurality of sheets is provided with a score line proximate the region of the adhesive, thereby facilitating the separation of each sheet from the pad of a plurality of sheets.

In some embodiments, a support sheet is provided below the bottom sheet of the plurality of sheets. In some embodiments, the support sheet is provided with a plurality of adhesive strips placed under and attached to the support sheet for adhering the pad to a supporting surface. In some embodiments, at least one release sheet is applied to the exposed the adhesive strips.

In some embodiments, the support sheet is a paper board sheet. In some embodiments, the support sheet is a chipboard sheet. In some embodiments, the paper board sheet is stiff or rigid.

In some embodiments, the slit sheet paper is a Kraft paper in the range from about 40 # to 60 #.

In some embodiments, the slit sheet paper has a slit pattern in the range from of approximately 0.45" slit length, 0.17" land length between ends of slits, and 0.11" row width between slits to approximately 0.40" slit length, 1.15" land length between ends of slits, and 0.1125" row width between slits.

In some embodiments, the slit sheet paper has a slit pattern with slits each having a length of 0.45" or less. In some embodiments, the slit sheet paper has a slit pattern with slits each having a length of 0.40" or less.

In some embodiments, the pad of a plurality of sheets of expandable slit paper is rolled to form a generally cylindrical configuration. In some embodiments, the pad of a plurality of sheets of expandable slit paper is rolled to form a roll of sheets of expandable slit paper.

In some embodiments, the expandable slit paper is an extensible paper having an extensibility in a machine direction of at least 5%. In some embodiments, the expandable slit paper is an extensible paper having an extensibility in a cross direction of at least 5%.

According to some other embodiments, a method of using a pad of a plurality of sheets of expandable slit paper is provided, said paper expanding in thickness when stretched to form expanded cells, wherein the sheets of expandable slit paper are bound together along a single edge and otherwise unbound together, includes: having the user manually grasp a top sheet of said plurality of sheets and pull the top sheet in a direction away from said single edge so as to cause said top sheet to expand to form a plurality of expanded cells; having the user wrap the expanded top sheet around an item.

In some embodiments, the method further includes: having the user wrap the expanded top sheet around the item while the top sheet remains bound at said single edge, whereby the top sheet is maintained in an expanded state during wrapping; and having the user separate the expanded top sheet from being bound at said single edge after wrapping of the item.

In accordance with some embodiments of the invention, a chip board type material as a backing for a smaller number of sheets is employed to provide an inexpensive dispensing device for uses where only a limited number of items require packing.

For the purposes of the preferred embodiments of the present invention, slit sheet paper employed can include, e.g., the paper and slit patterns described in U.S. Pat. No. 5,667,871, the entire disclosure of which is incorporated herein by reference.

Further information relating to exemplary slit sheet paper that can be used in the present invention, slit patterns of such papers, and the expansion process by which the slit sheet paper is expanded is found in the following patents and applications, the entire disclosures of which are all incorporated herein by reference: U.S. Pat. Nos. 5,538,778; 5,667,871; 5,688,578; 5,782,735; 3,908,071; PCT Application No. WO84/02936; U.S. Patent Application Pub. No. 2002/0060034; U.S. Patent Application Pub. No. 2007/0240841; U.S. Pat. Nos. 3,104,197; 3,220,116; 3,266,972; 3,269,393; 3,908,071; 6,024,832; 6,458,447; 6,712,930 B2. As indicated, the entire disclosures of the foregoing patents, publications and applications are all incorporated by reference herein, as though recited in full.

Figure 7A:
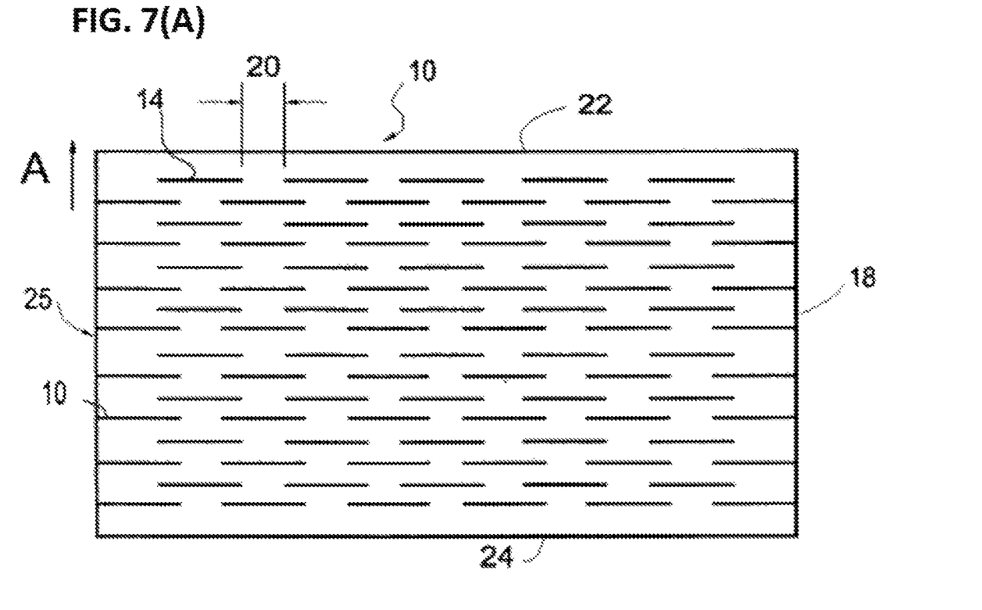
FIGS. 7(A) and 7(B) show existing slit sheet expandable paper structure that can be employed in some embodiments of the present invention.
Figure 7B:
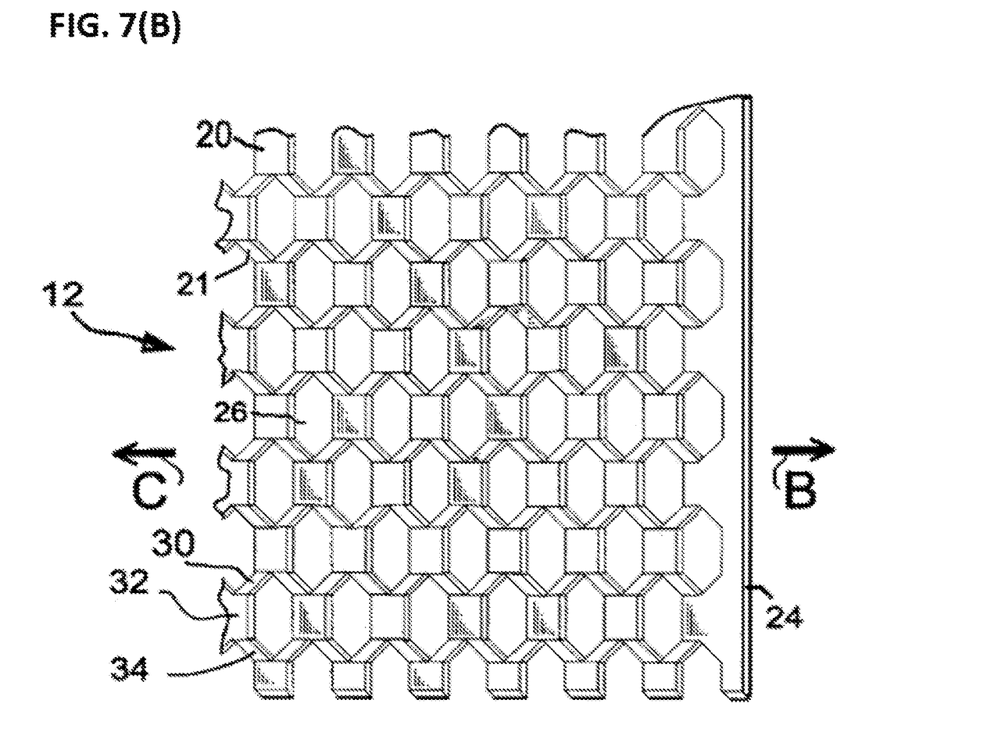

For reference, FIGS. 7(A) and 7(B) correspond to FIGS. 1 and 3 of U.S. Pat. No. 5,667,871 (the '871 patent). These figures describe existing "slit sheet" expandable paper structure. As explained in the '871 patent:

"The slit paper, indicated generally as 10, is illustrated in FIG. [7(A)] as it would come off the slitting machine. The sheets can be formed on a flat-bed slitter and produced directly as rectangular sheets, as well as on a rotary slitter and cut into individual sheets or stored directly as a continuous sheet in roll form."

"The flexible sheet 10 is preferably manufactured from exclusively recycled paper with the grain of the paper running in the direction of arrow A. The flexible sheet 10 is provided with slits 14 and slits 16 are parallel to the edges 22 and 24 of the flexible sheet 12 and perpendicular to the paper grain. The slits 14 and slits 16 are placed in rows and separated from one another by land 20 and legs 21 [shown in FIG. 7(B)]. The land 20 is a consistent size and provides the support required to prevent the paper from tearing into strips when opened. The cushioning effect is produced by the flexing of the lands and legs under a load. It is therefore necessary that the land 20 be of sufficient size to provide cushioning. The spacing between the rows of slits 14 and slits 16 must also be of sufficient size to prevent the paper from tearing. The offset positioning of the rows of slits 14 and slits 16 gives the paper resiliency when opened and is discussed in detail further hereinafter. The existence of partial slits 14 and 16 at the ends 25 and 18 of the flexible sheet 10 do not hinder the efficiency of the slit paper 10. The flexible sheet 10 when flat; lies in a first plane."

"When expanded, the expanded sheet, indicated generally as 12, is formed of hexagonal cells 26, legs 21 and land 20 areas, as illustrated in FIG. [7(B)]. Preferably, at least a majority of the land 20 areas lie in a plurality of parallel planes. The planes of the land 20 areas form an angle of at least about 45 degrees with the plane of the sheet in flat form."

"The slitting operation in which the slits are cut into the sheet material can take several forms. In one embodiment, rectangular sheets are provide with its total number of slits in one action. The term rectangular should be understood to include rectangles in which all four sides are equal, that is, square. Where the sheet material is subjected to rotary cutting or slitting, the pressure required for the cutting action is significantly lower that which is required for the flat bed cut, since essentially only a single row or a few rows of slits are cut simultaneously. Unlike prior art structures and systems, expansion contemporaneous with slitting is not desirable. Therefore a critical balance must be struck between resistance to opening of the cells during the rewind step and ease of opening of cells during the expansion step. By achieving this critical balance and producing a flat, unexpanded sheet, the sheet material has an effective thickness which is as much as one twentieth of the thickness of a sheet of expanded material. The compact configuration provides for the optimization of shipping and storage."

In the preferred embodiments, the term "slit sheet" means an expandable paper sheet having a slit pattern. The following are direct quotes of U.S. Pat. No. 5,667,871 (the '871 patent).

First, column 10, lines 13-48, of the '871 patent explains:

"The length of the slit and the ratio of the land intervals between slit affects the dimensions of the polygons which are formed during the expansion step. The higher the ratio of slit length to interval length the greater is the maximum angle which can be formed between the plane of the sheet and the planes of the land areas. The greater the uniformity of the shape and size of the formed polygonal shaped open areas and the angle to which the land areas incline relative to the flat sheet, the greater is the degree to which interlocking of land areas can be achieved. Interlocking of land areas, that is, the nesting of layers of sheets, reduces the effective thickness of the sheets. However, the net effect is still a dramatic increase in effective sheet thickness. For example, 0.008 inch thick paper having a silt pattern of a ½" slit, 3/16" slit spacing, and ⅛" row spacing, produces a ¼" by 3/16" land which can expand to under about one quarter of an inch thickness and will have a net effective thickness for two layers, when nested, of about 0.375 inches. It is noted that the land width is double the width of the legs. The net effect is a useful thickness expansion of roughly 20 times the unexpanded thickness of the paper."

"The longer the slit relative to the rigidity of the sheet material, the weaker is the interlocking effect and the cushioning effect due to the weakness of the expanded structure. If the slits are too small, expansion can be severely limited and cushioning can be excessively limited. This does not mean that the dimensions are narrowly critical, but rather that the dimension must be selected relative to the characteristics of the paper, as for example the degree of rigidity, and the cushioning or energy absorbing effects which are required. The resistance to expansion increases relative to the increase in the size of the land areas. It should be understood that some resistance to opening is desired. The object rests on, or contacts the edge of the sheet formed by the incline of the land areas which turns the perimeter of the openings into upper and lower edges."

Second, column 10, lines 58-67 and column 11, lines 1-6, of the '871 patent further explains:

"As heretofore mentioned, the slit dimensions can be varied to ease the process of opening. A ⅝" slit, 3/16" land by 3/16 row opens very easily since the number of hexagons is reduced. When the size of the hexagons are increased and the numbers decreased; the stretched thickness was increased, producing a very viable wrap material. This sizing increases the yield of the paper and provides almost the same protection as the ½" slit. This sizing provides a less expensive product utilizing a larger content of post consumer waste while maintaining the integrity of the wrap product. The ½" slit, 3/16" land by ⅛" row pattern produces a more protective wrap due to the greater number of wraps that can be made within the same volume. Thus, a 2% pound vase dropped from a thirty inch height, with only ½" of cumulative sheet thickness around the vase, can be protected with the ½" slit, ¼ by 3/16 inch land pattern."

In some preferred embodiments, the expandable slit sheet dispenser has a physical appearance that is similar to paper pads that are sometimes referred to as note pads, writing pads, drawing pads, and/or legal pads. Typically, such paper pads are in the form of a book or binder of paper pages (often, with line rules), used for purposes such as recording notes or memoranda, writing, drawing or scrapbooking. Specifically, with such paper pads, the papers are typically used for writing purposes in which a user can, e.g., write upon sheets of paper within the paper pad.

While paper pads are typically bound sheets of flat paper bound to a heavy weight back sheet, as for example formed of cardboard, the present invention is a unique physical structure having layers of expandable slit sheets. The expandable slit sheet paper has an entirely different function and purpose than paper in common paper pads. In particular, the expandable slit sheet paper can be, e.g., expanded in a manner to increase its thickness and wrapped around an item for protection of the item. Moreover, the support of the expandable slit sheet paper not only retains the expandable slit sheet paper for storage, but the support also serves to enable expansion of the expandable slit sheet paper as it is pulled from the support.

In some illustrative embodiments, embodiments of the present invention can be manufactured in accordance with the disclosures of the following patents, publications and applications, the entire disclosures of which are all incorporated herein by reference: U.S. Pat. No. 7,175,731; U.S. Patent Application Pub. No. 2007/0204572; Canadian Patent No. CA1312889C; U.S. Pat. No. 5,299,833; PCT Application No. WO98/57810; U.S. Pat. Nos. 3,778,324; 3,937,491; 848,680; 4,149,288; 8,702,085; 741,878; 2,367,608; and 5,112,083 (see, e.g., FIG. 6). As indicated, the entire disclosures of the foregoing patents, publications and applications are all incorporated by reference herein, as though recited in full.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF DRAWINGS

The preferred embodiments of the present invention are shown by a way of example, and not limitation, in the accompanying figures, in which:

FIG. 6 is a side view of an alternate design in which a support is configured to hang the dispenser pad from a wall or the like.

THE PREFERRED EMBODIMENTS OF THE INVENTION

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

DESCRIPTION OF PREFERRED EMBODIMENTS OF THE INVENTION

The entire disclosures of U.S. patent application Ser. Nos. 15/428,144 and 16/018,702, of U.S. Pat. No. 10,669,086 (which corresponds to the '702 application), of U.S. patent application Ser. No. 16/929,836, and of U.S. Provisional Application No. 62/874,163 (which corresponds to the '836 application) are all incorporated by reference in their entireties, and referenced and recited herein as if in full as part of the description of the present application.

U.S. Pat. No. 10,669,086 (the '086 patent) describes a use of extensible paper to greatly reduce the tension required to stretch the slit sheet material. Advantageously, the dispensing pad utilizes the extensible paper of the '086 patent in some preferred embodiments of the present invention. Among other things, the stretching with extensible paper provides greater resiliency while further facilitating the ease of stretching the slit sheet manually.

This invention also relates to the use of a slit sheet material in combination with extensible paper to manufacture a pad and envelope product that is more resilient but, thinner for better utilization of space.

In accordance with one broad embodiment of the invention, an expanded slit sheet paper is made with an extensible paper that, e.g., advantageously substantially reduces a pulling force necessary to expand the expanded slit sheet material. Among other benefits, this reduced pulling force leads to a variety of very substantial benefits, including that it avoids previously required complex resistant devices that were previously necessary and opens the market to smaller manual expansion devices that can be made to be completely or almost completely recyclable. In accordance with one broad embodiment of the invention, the use of extensible paper reduces the pulling force necessary to stretch the expanded slit sheet material and thereby expands the market to include, e.g., void fill usage and lighter weight papers for greater cushioning effect for very fragile items.

In accordance with another embodiment of the invention, the use of extensible paper reduces the tendency of the slit paper to tear during the expanding of the expandable slit sheet paper without negating the ability to tear the expanded slit sheet paper from the support at, e.g., the end of a wrapping step or the like.

The above-noted U.S. application Ser. No. 16/929,836 and U.S. Provisional Application No. 62/874,163 describe the use of reduced cell sizes for slit sheet material to increase the resiliency of cells. Advantageously, the dispensing pad utilizes the extensible paper of the '836 and '163 applications in some embodiments of the present invention.

According to some embodiments, the slit sheet paper is made with an extensible paper. According to some embodiments, the extensible paper is extensible in a machine direction in a range of at least 5%. According to some embodiments, the extensible paper is extensible in a cross direction in a range of at least 5%. According to some embodiments, the extensible paper is extensible in a machine direction in a range of at least 5% and in a cross direction in a range of at least 5%. According to some embodiments, the extensible paper is extensible in a machine direction in a range of at least 6% and in a cross direction in a range of at least 6%. According to some embodiments, the extensible paper is extensible in a machine direction in a range of at least 7% and in a cross direction in a range of at least 7%. According to some, most preferred, embodiments, the extensible paper is extensible in a machine direction in a range of at least 8% and in a cross direction in a range of at least 8%. According to some embodiments, the extensible paper is extensible in a machine direction in a range of between 5% to 15% and in a cross direction in a range of between 5% to 15%. According to some embodiments, the extensible paper is extensible in a machine direction in a range of between 7% to 15% and in a cross direction in a range of between 7% to 15%. According to some embodiments, the extensible paper is extensible in a machine direction in a range between 3 to 20%. According to some embodiments, the extensible paper is extensible in a cross direction in a range between 3 to 20%. It should be appreciated that the extensibility of the paper corresponds to the extensibility of the paper in an unslit state—i.e., corresponds to the extensible nature of the material of the paper itself.

In some exemplary and non-limiting embodiments, a preferred reduced slit pattern utilizing 50 # Kraft paper with a slit pattern of approximately 0.45" slit, 0.17" land, 0.11" row width yields about 2.72-2.92 pounds of per inch of crush strength which, can yield a 27% increase in strength with a 10% decrease in thickness from approximately 0.187" to 0.169". Another exemplary and non-limiting preferred slit pattern is approximately 0.40" slit, 1.15" land, 0.1125" row width, yielding 3.1-3.3 pounds per inch crush strength which produces a 40% increase in crush strength from 0.1875" to 0.169." Although for clarity dimensions may be provided to four decimal places, in some other embodiments, the dimensions can vary +/−15% and, preferably, +/−10%.

It has now been found that the shorter paper fibers make them stiffer and therefore increases their strength which, can be extrapolated by the ratio in the thicknesses of the sheet from 0.1875 to 0.16875 which, in this case is a 10% increase in strength if all things were equal but, they are not. The additional increase in strength is also due to the decrease, which is preferably about 10% in cell size as compared to the prior art slit pattern. This provides more cells per square foot and accordingly a greater crush resistance. Increased crush resistance generally correlates directly with increased cushioning. Increased crush resistance is good for cushioning some things and not for others. For the most part, the items placed in an envelope require less crush distance to absorb shock. Something extreme fragile might require 2" of distance to absorb shock to be safe.

In the present invention, (1) it has now been found that varying the legs per square foot enables fine-tuning of the cushioning properties, as needed, and (2) for most applications, advantageously, increasing the resiliency of an already non-vertical but, fully stretched item, provides improved cushioning.

This increase in strength can be offset by reducing the thickness (weight) of the paper which can provide equivalent crush strength while providing for a reduction in overall height. In this case the use of 40 # paper would reduce the leg stiffness but would reduce the cost of the paper. Stated another way, the reduction in height of the cells (a shorter distance between rows of un-slit material) (1) uses less paper and the increased stiffness can further be adjusted (decreased) by (2) reducing the thickness of the paper further decreasing the use of paper.

In some preferred embodiments, the dimensions of the expandable slit sheet paper are proportionally reduced from an expandable slit sheet paper having a 0.5" slit length, a ⅛" (0.125 inch) spacing between rows, and a spacing between slits within the same row (i.e., land length) of 3/16" (0.1875 inch) as follows: a) the row spacing is proportionally reduced by a ratio SL(new)/0.5 and b) the slit spacing is set at SL(new) divided by 2.6667. For example, some preferred embodiments include dimensions as set forth below Table A:

|  | Slit Length (SL) | Slit Spacing (SS) | Row Spacing (RS) |
| --- | --- | --- | --- |
| Example A | 0.45 inches | 0.1687 inches | 0.1125 inches |
| Example B | 0.425 inches | 0.1594 inches | 0.1063 inches |
| Example C | 0.40 inches | 0.1500 inches | 0.1000 inches |
| Example D | 0.375 inches | 0.1406 inches | 0.9375 inches |
| Example E | 0.35 inches | 0.13125 inches | 0.0875 inches |
| Example F | 0.325 inches | 0.1219 inches | 0.0813 inches |
| Example G | 0.30 inches | 0.1125 inches | 0.0750 inches |
| Example H | 0.275 inches | 0.1031 inches | 0.0688 inches |
| Example I | 0.25 inches | 0.09375 inches | 0.0625 inches |

In some preferred embodiments, the corresponding row spacings of the Examples A to I in the above Table A are substantially as shown in Table A. In some preferred embodiments, the row spacings of Examples A to I can be substantially as shown in Table A plus or minus 20%, or, more preferably, substantially as shown in Table A plus or minus 15%, or, more preferably, substantially as shown in Table A plus or minus 10%, or, more preferably, substantially as shown in Table A plus or minus 5%.

Figure 1:
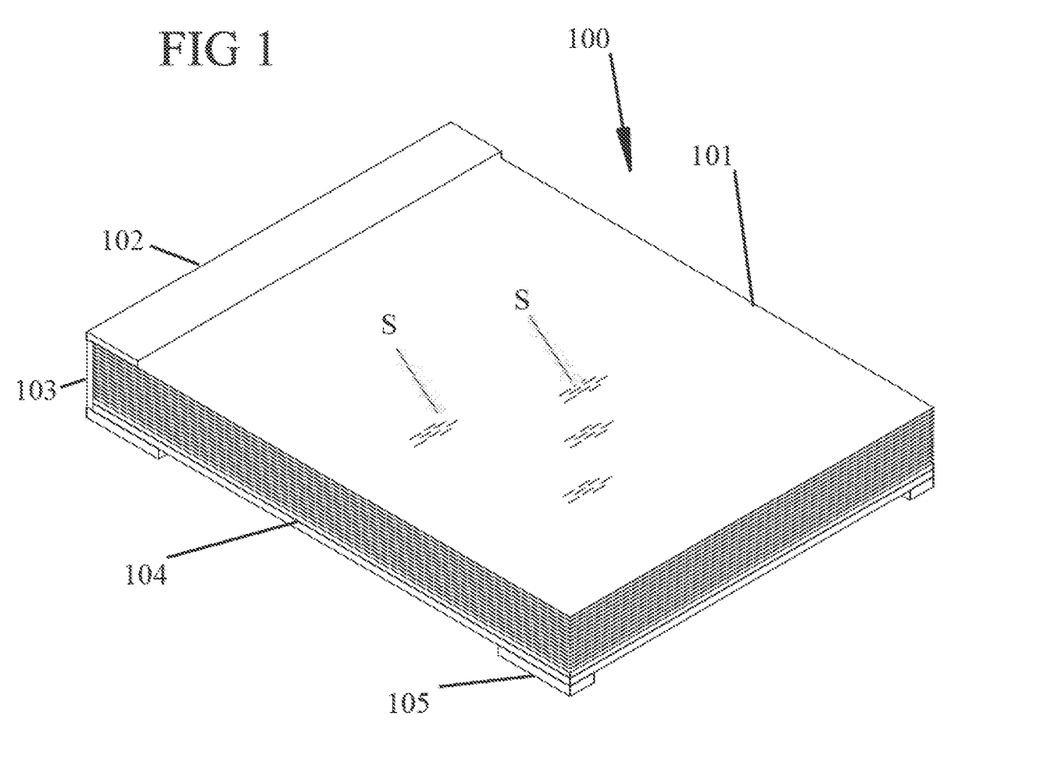
FIG. 1 is a perspective view of the chip board, or the like, backing with sheets of unexpanded slit sheet material.

The dispensing pad, as shown in FIG. 1, in its preferred embodiment is to be made from paper and further it is to be made from corrugated paper or paper made from chip board normally found within the art. The chip board or the like is also the dispenser of the slit sheet material by having the slit sheets held at the opposite end of the packer with non-permanent adhesive attaching the chipboard sheet or the like to the packing table.

Figure 2:
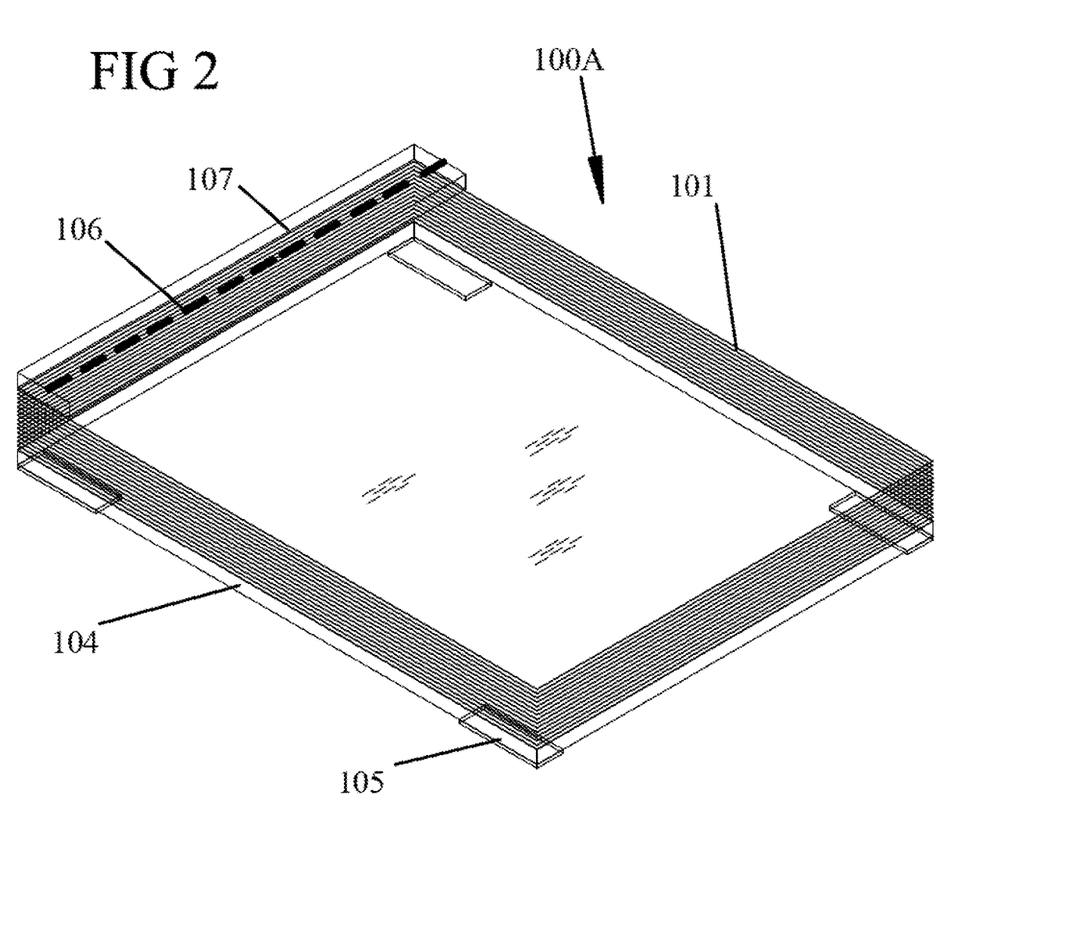
FIG. 2 is a perspective view of an alternate design which reduces the use of the chipboard.

A preferred embodiment, as shown in FIG. 2, is the slit sheet paper can be attached to back of the chipboard material with adhesive, staples, or with sewing thread. In other embodiments, other forms of attachment can be employed. The smallest surface area is optimal for the adhesion so that most of the slit sheet material can be stretched into the three-dimensional hexagonal shape. The term "three dimensional" is employed to distinguish the slit sheet material that has been expanded in thickness as compared to a flat sheet which has minimal thickness. The volume of the expanded slit sheet can be on the order of at least 20 times that of the unexpanded slit sheet. In the illustrative case of slit sheet material having ⅛" rows, 0.5" slits, and 0.1875 unslit rows, the expansion from flat 50 # paper (0.0045" thick) to 0.1875" produces a volume expansion of about 41 times.

A second preferred embodiment is with releasable adhesive such that the adhesive holds firm during the wrapping of the top sheet but, pulls away so as not to produce any waste and the entire sheet is used for wrapping. In some embodiments, each sheet can be coated with releasable adhesive on the bottom and then stacked on top of the chipboard base.

In a further preferred embodiment, the stack of expandable slit sheets can be held together with one or more staples proximate an edge of the stack, preferably the top edge.

Figure 3:
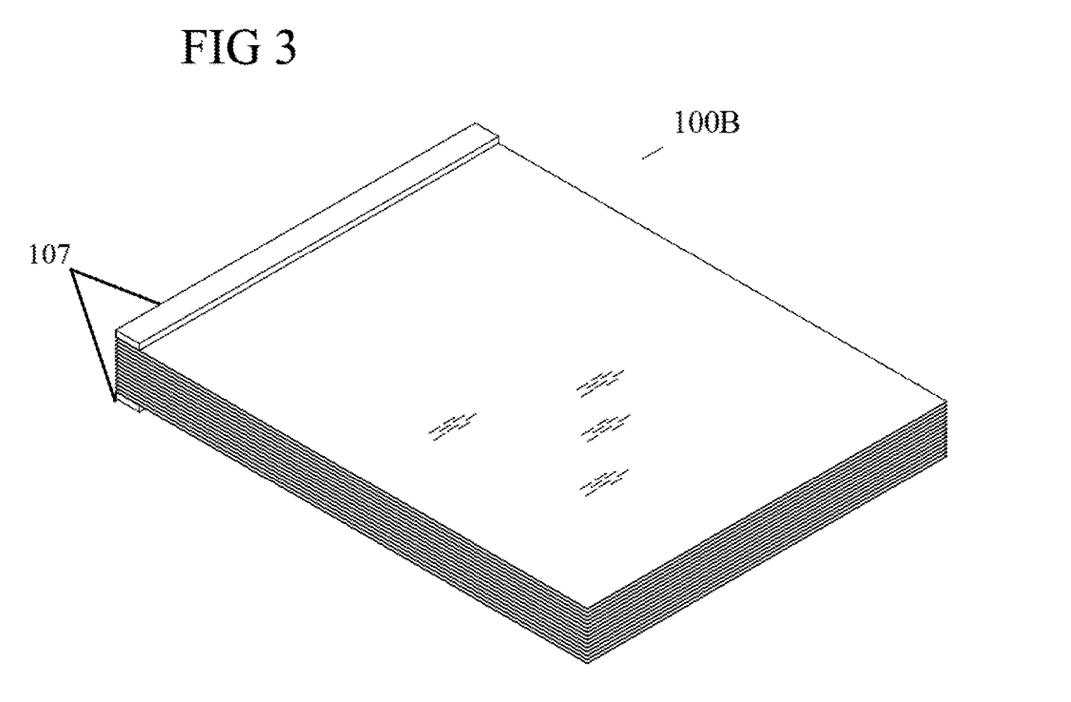
FIG. 3 is a perspective view of an alternate adhesive design that eliminates the need for a bottom pad.

Another preferred embodiment, as shown in FIG. 3 is without a bottom pad. In some implementations, the absence of the bottom pad beneficially enables the pad to be rolled up and stored in roll form or can be folded over. The slit sheets are paper and, therefore, very flexible providing an option to fold it over (e.g., in half) or roll it up in a tube and held in place with a rubber band or the like. The bottom sheet could be slit sheet material or not. In some embodiments, the bottom sheet has a releasable adhesive to hold it to the table.

Another preferred embodiment is without a bottom where it is beneficial to store in roll form and laid flat when ready to be used. The adhesive on the bottom can be releasable adhesive only on the back side such that when the last sheet is used it would lift off the table, thus, leaving no wasted slit sheet material.

Figure 5:
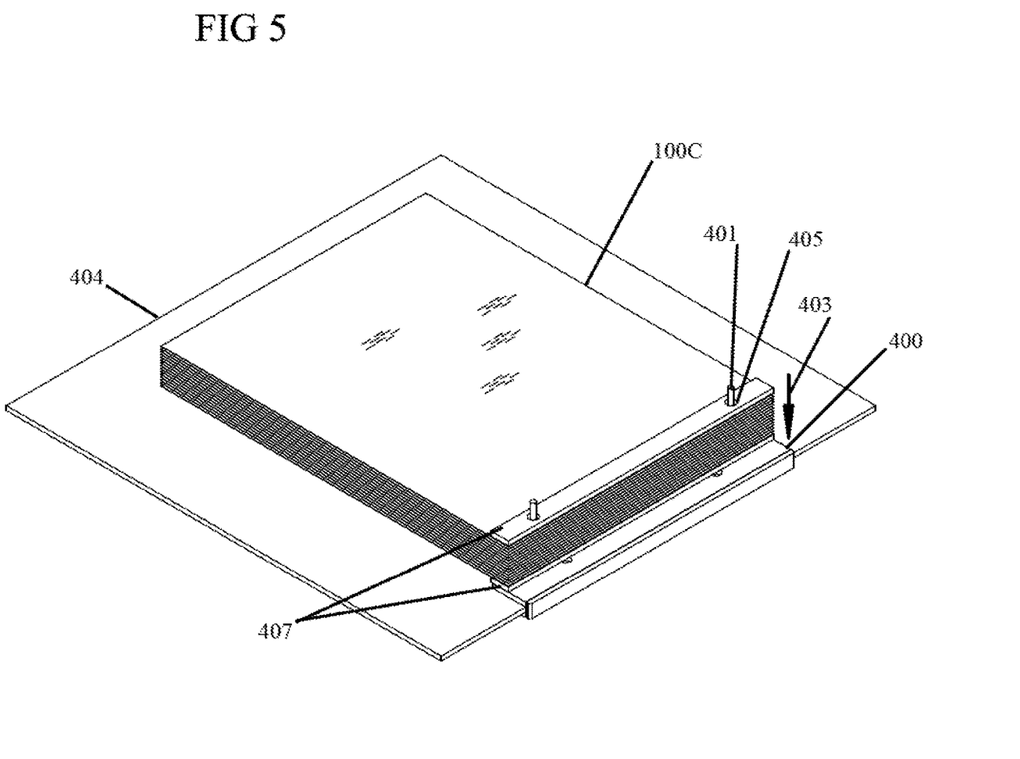
FIG. 5 is a perspective view of the alternate dual pin design that shows the paper loaded to be used.

Another preferred embodiment, as shown in FIG. 5, employs dual pins that pass through premade holes in the slit sheet and chipboard to hold the sheets in place. While at least two pins are shown, a greater number of pins can be used. The dual pin fixture is made from plastic or metal or the like such that it can either be adhered, clamped, screwed or otherwise attached to the back of a table as shown.

In some embodiments, the preferred size of the pad dispenser is such as to be ergonomically viable. In some preferred embodiments, the preferred size includes rectangular sheets of slit sheet expandable sheets that are about 15.25" wide by 20" long in an unstretched state. In some preferred embodiments, this configuration in an unstretched, results in an approximately 12 inch wide by 32 inch long three dimensional expanded slit sheet paper having an array of hexagonal shape cells caused by the expanded slits.

In use, an individual using the dispensing pad would grab the top sheet of expandable slit sheet paper in an unexpanded state, and pull to stretch the slit sheet paper such as to create the dimensionally expanded slit sheet. Then, the individual would preferably place an item to be packed on top of the expanded slit paper and wrap the item. This manner of wrapping is similar to that known in the art in relation to roll-type expandable slit sheet paper.

Advantageously, in various embodiments, the dimensions of the unstretched slit sheet paper can be varied as desired, such as, e.g., as required or preferred by users. For example, very small sized pads with dimensions of even less than about 4 inch wide by 4 inch long could be used to wrap very small items. As another example, larger pads with larger dimensions could be used to wrap larger items.

In use, if the item to be wrapped requires more than one sheet of expanded slit sheet material, the individual user (i.e., packer) could wrap the item in a first expanded slit sheet, after wrapping the item tear the expanded first slit sheet paper away from the back of the dispensing pad and then place the now wrapped item onto the unstretched slit sheet below the removed first sheet, which has become the top sheet of the dispensing pad. Then, the user can repeat the process and wrap the item with a second sheet of expanded slit sheet paper. In particular, while holding the wrapped item, the user can grab the top sheet and pull it to expand the top sheet and then wrap the item a second time for further wrapping.

If sufficient wrapping material has been deemed to be obtained from the two sheets, the user could then place the item within a box for shipping or otherwise store the wrapped item. If not, a third sheet can be wrapped around the wrapped product to provide even further protection. Similarly, the user can wrap the item with even more sheets; that is, the user can wrap the item with as many sheets as deemed necessary or desired.

Further Discussion of the Illustrated Embodiments

FIG. 1 is a perspective view of one embodiment of the dispensing pad 100 that includes a number of unexpanded slit sheets 101 (having an array of slits S extending across all or substantially all of the area of each of the sheets 101) placed on a support that includes, e.g., a board 104 (such as, e.g., in a preferred embodiment a chipboard sheet 104), which is attached to a vertical section 103 and an upper horizontal section 102. In the illustrated embodiment, a plurality of adhesive strips 105 (e.g., four in this illustrative embodiments at the corresponding corners of the board 104) are attached to the chipboard sheet 104 as shown. In some embodiments, the slit sheets are adhered by adhesive to the board 104 (e.g., in a region close to the vertical section 103, such as, e.g., under the upper horizontal section 102), the vertical section (e.g., which can be adhered to ends of the respective slit sheets 101, and/or the upper horizontal section 102. Additionally, in some embodiments the end regions of the slit sheets 101 close to the vertical section 103 can be adhered to one another (e.g., in a region close to the vertical section 103, such as, e.g., under the upper horizontal section 102).

FIG. 2 is perspective view of another embodiment where a dispensing pad 100A includes only a bottom sheet 104 that has the slit sheets 101 placed on top and adhered in the a rectangular area depicted as 107 either by staples 106 or adhesive or the like. As in the embodiment shown in FIG. 1, a plurality of adhesive strips (e.g., four in this illustrated embodiment) are placed under and attached to chipboard layer 104. In the preferred implementations, the embodiment shown in FIG. 2 omits the vertical section 103 and the upper horizontal section 102 of the embodiment shown in FIG. 1; rather, the embodiment shown in FIG. 2 either a) adheres the slit sheets 101 to the board 104 and to one another using adhesive that is within the rectangular region 107 shown in FIG. 2 (e.g., which corresponds approximately to regions under the area that is covered by the upper horizontal section 102 shown in FIG. 1), or fixes the slit sheets 101 to the board and to one another using a plurality of stables 106 that extend through the slit sheets 101 and the board 104, or that attaches the slit sheets 101 to the board 104 and one another employing a combination of staples and adhesive. In other embodiments, other forms of connectors can be employed instead of or in addition to adhesive and/or staples, such as, e.g., nuts and bolts, thread, clips and/or other forms of connectors. In the embodiment shown in FIG. 2, it should be understood that the region 107, although depicted schematically as a rectangular box region, is intended to identify a proximate region for application of adhesive, rather than a block that is attached to the dispensing pad.

FIG. 3 is a perspective view of another embodiment where a dispensing pad 100B is only made from the slit sheet material (e.g., similar to 101 shown in FIGS. 101 and 102) that is releasably adhered to each other and to the packing table in areas 107. In the embodiment shown in FIG. 3, it should also be understood that the region 107, although depicted schematically as a rectangular box region, is intended to identify a proximate region for application of adhesive, rather than a block that is attached to the dispensing pad. Additionally, in this embodiment, it should also be understood that the adhesive would also preferably extend within this region 107 in between adjacent slit sheets 101.

Figure 4:
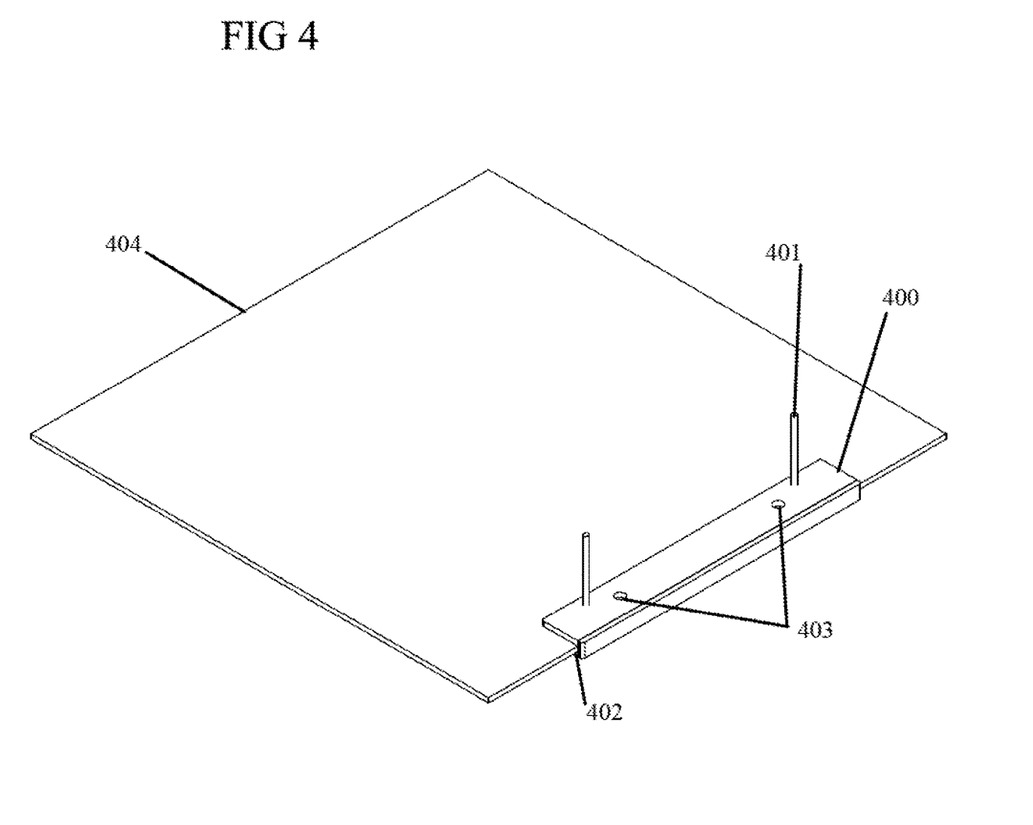
FIG. 4 is a perspective view of an alternate design that uses a dual pin type fixture to attach the sheets to the back of the packing table.

FIG. 4 is a perspective view of another embodiment where a fixture 400 is employed that retains a stack of slit sheets 101 (not shown in FIG. 4). In the preferred embodiments, the fixture is configured to be supported on another surface, such as, e.g., upon a table surface or upon another surface. For example, in the example shown in FIG. 4, the fixture 400 is placed at the back side of a table 404. Here, the table 404 can operate as a packing table at which a user uses the dispensing pad to wrap items. For example, in some embodiments, the user can stand alongside a front side of the table (i.e., opposite to the back side of the table at which the fixture 400 is mounted as shown in FIG. 4), and the user can manipulate the slit sheets 101 that are supported on the fixture from this front position, whereby the user can expand the unexpanded slit sheets by pulling the sheets towards the user so as to elongate the slit sheets while the opposite end is connected to the fixture 400.

In the illustrative example shown in FIG. 4, a plurality of pins (e.g., two pins 401 in the illustrated embodiment) are permanently attached to the fixture 400. In some embodiments, the fixture 400 is attached to the table with adhesive; in other embodiments, the fixture 400 can be screwed to the table using holes 403; in other embodiments, the fixture 400 can be clipped to the back of the table 404 using a "U" or "L" shape connector shown in area 402 that is configured to extend around the end of a table. In some embodiments, in order to fit on different table thicknesses, the connector can be adjustable, such as, e.g., employing an adjustable screw member to accommodate different table thicknesses.

In the preferred embodiments, the pins 401 are arranged to pass through corresponding through-holes extending through the stack of slit sheets 101 proximate an end of a stack of slit sheets 101, such as to support the slit sheet papers 101. FIG. 5 is a perspective view of the fixture 400 with a stack of slit sheet paper 100C loaded by using through-holes 405 that are within the slit sheet material 101 for the pins 401 to pass through such that the stack of slit sheet paper 100C eventually rests onto the table 404 when slid over the pins in a downward direction as shown with arrow 403. In some embodiments, the stack of slit sheet paper can include a board 104, such as, e.g., a chipboard, similar to the embodiments shown in FIGS. 1 and 2. In some alternative embodiments, the stack of slit sheet paper 100C can omit such a board 104, similar to the embodiment shown in FIG. 3.

Figure 6:
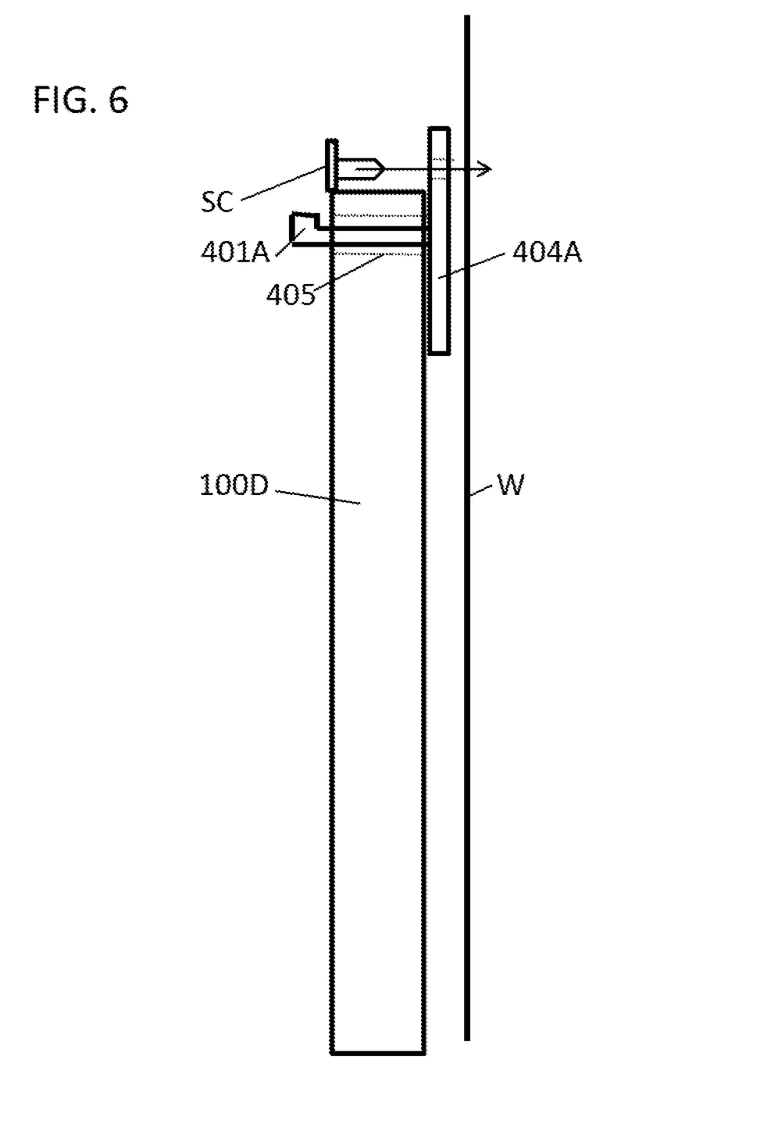

FIG. 6 shows another embodiment which is similar to the embodiment shown in FIGS. 4-5, but adapted such that the dispenser pad 100D is supported in an upright (e.g., vertical) orientation, such as, e.g., along a wall, beam or other non-horizontal surface. In some embodiments, supporting of a dispenser pad 100D from a wall or the like can facilitate saving of space and be useful where space is restricted.

As shown in FIG. 6, in some embodiments, a fixture 404A can be mounted to a non-horizontal surface W, such as, e.g., a side of a wall or column or the like. In the illustrated example, the fixture 404A includes through holes for a plurality of screws SC which can mount the fixture upon a wall or the like (see arrow adjacent screw SC showing the mounting of the fixture). In the embodiment shown in FIG. 6, to facilitate retention of the dispenser pad 100D, the distal ends of the pins 401A are turned up slightly to provide a restricting step that retains the dispenser pad 100D when supported on the pins 401A. Although only one pin 401A is shown in the side view shown in FIG. 6, in the preferred embodiments two or more pins 401A are employed.

While FIGS. 1-5 illustrate substantially horizontally mounted dispenser pads and FIG. 6 illustrates a substantially vertically mounted dispenser pad, it should be appreciated that the surfaces of the embodiments shown in these figures can be at various angles. For example, the devices of FIGS. 1-5 could be used upon surfaces having rather step angles of inclination, including angles greater than 15 degrees inclination from horizontal, or even greater than 30 degrees inclination from horizontal, or even greater than 45 degrees from horizontal, or even greater than 60 degrees from horizontal. Similarly, the device of FIG. 6 could be mounted upon surfaces of various angles of inclination, including even horizontal surfaces.

In the embodiment shown in FIG. 6, the dispensing pad can be similar to any of the dispensing pads of the embodiments shown in FIGS. 1-5, with the embodiment shown in FIG. 5 being employed in some preferred embodiments.

Although not depicted in the figures, in some preferred embodiments (i.e., which can be implemented in any of the embodiments shown in FIGS. 1-6), each sheet of the plurality of sheets in the dispenser pad is provided with a score line that is proximate the region at which the sheet is connected to the support, thereby facilitating the separation of each sheet from the pad of a plurality of sheets. For example, a score line can include a substantially linear indentation formed across a width of each sheet proximate the region at which the sheet is connected to the support. As another example, a score line can include a row of perforations or through-holes extending entirely or partly through the sheet formed across a width of each sheet proximate the region at which the sheet is connected to the support. By way of example, in the embodiments shown in FIGS. 4-5 and FIG. 6, score lines could be implemented across a width of each respective sheet 101 at a location adjacent the holes 405, such that when a corresponding sheet is removed, a narrow strip portion of the sheet having the holes 405 is retained on the pins 401 or 401A.

Preferred Embodiments of the Invention

A number of preferred embodiments of the present invention are summarized below.

A pad of a plurality of sheets of expandable slit paper, said paper being characterized by expanding in thickness when stretched to form hexagonal cells. The sheets of expandable slit paper are bound together along a single edge and otherwise unbound together.

A pad of a plurality of sheets of expandable slit paper, said paper being characterized by expanding in thickness when stretched to form hexagonal cells. The sheets of expandable slit paper are bound together along a single edge and otherwise unbound together. At least one staple is applied to the pad of a plurality of sheets, proximate the single edge. Preferably, a plurality of staples is applied to the pad of a plurality of sheets.

A pad of a plurality of sheets of expandable slit paper, said paper being characterized by expanding in thickness when stretched to form hexagonal cells. The sheets of expandable slit paper are bound together along a single edge and otherwise unbound together. A releasable adhesive is applied to each sheet in the region of the single edge.

A pad of a plurality of sheets of expandable slit paper, said paper being characterized by expanding in thickness when stretched to form hexagonal cells. The sheets of expandable slit paper are bound together along a single edge and otherwise unbound together. An adhesive is applied to each sheet in the region of the single edge thereby binding together the plurality of sheets of expandable paper.

A pad of a plurality of sheets of expandable slit paper, said paper being characterized by expanding in thickness when stretched to form hexagonal cells. The sheets of expandable slit paper are bound together along a single edge and otherwise unbound together. An adhesive is applied to each sheet in the region of the single edge thereby binding together the plurality of sheets of expandable paper. Each sheet of the plurality of sheets is provided with a score line proximate the region of the adhesive, thereby facilitating the separation of each sheet from the pad of a plurality of sheets.

A pad of a plurality of sheets of expandable slit paper, said paper being characterized by expanding in thickness when stretched to form hexagonal cells. The sheets of expandable slit paper are bound together along a single edge and otherwise unbound together. At least one staple is applied to the pad of a plurality of sheets, proximate the single edge. Each sheet of the plurality of sheets is provided with a score line such as perforations, proximate a region formed by the at least one staple, thereby facilitating the separation of each sheet from the pad of a plurality of sheets. Preferably, a plurality of staples is applied to the pad of a plurality of sheets. The slits in the paper can serve the same function as perforations that are employed to separate a sheet from the region in which sheets are bound together.

A pad of a plurality of sheets of expandable slit paper, the paper being characterized by expanding in thickness when stretched to form hexagonal cells. The sheets of expandable slit paper are bound together along a single edge and otherwise unbound together. A support sheet can be provided below the bottom sheet of the plurality of sheets.

A pad of a plurality of sheets of expandable slit paper, the paper being characterized by expanding in thickness when stretched to form hexagonal cells. The sheets of expandable slit paper are bound together along a single edge and otherwise unbound together. A support sheet is provided below the bottom layer the plurality of sheets. The support sheet is provided with a plurality of adhesive strips placed under and attached to support sheet of chipboard or similar support material. Preferable at least four adhesive strips are employed. The adhesive strips are permanently bonded to the support sheet which can be of a stiff or rigid material such as chip board, but the adhesive strips can otherwise be of a releasable adhesive for releasable attachment to a work surface, such as a table. A release sheet can applied to the exposed surface of the releasable adhesive. An embodiment of the pad can employ extensible paper as described above. In a further embodiment the pad can employ a preferred reduced slit pattern utilizing Kraft paper in the range from about 40 to 60 # and advantageously, 50 # with a slit pattern in the range from of approximately 0.45" slit, 0.17" land, and 0.11" row width to approximately 0.40" slit, 1.15" land, and 0.1125" row width. In a further embodiment, advantageously extensible paper can be provided with the reduced slit pattern.

A pad of a plurality of sheets of expandable slit paper, the paper being characterized by expanding in thickness when stretched to form hexagonal cells. The sheets of expandable slit paper are bound together along a single edge and otherwise unbound together. The pad of a plurality of sheets of expandable slit paper is rolled to form a cylindrical configuration.

A pad of a plurality of sheets of expandable slit paper, the paper being characterized by expanding in thickness when stretched to form hexagonal cells. The sheets of expandable slit paper are bound together along a single edge and otherwise unbound together. The pad of a plurality of sheets of expandable slit paper is rolled to form a roll of sheets of expandable slit paper.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

The use of individual numerical values is stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term "about", "substantially", or "approximately".

Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" should be understood to mean the numerical value, plus or minus 15%.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A pad, comprising:
a plurality of sheets of expandable slit paper,
said paper expanding in thickness when stretched to form expanded cells,
wherein the sheets of expandable slit paper are bound together along a single edge and otherwise unbound together,
wherein each of said plurality of sheets of expandable slit paper includes an array of slits that form said expanded cells when the respective sheet is manually pulled away from said single edge along a plane of the respective sheet, and
wherein said pad includes an adhesive or connector configured to fix said pad to a table or supporting surface such that when a user manually grasps a top sheet of said plurality of sheets and pulls the top sheet in a direction away from said single edge, said pad remains fixed to said table or supporting surface while said top sheet expands to form a plurality of expanded cells.

2. The pad according to claim 1, wherein said slits extend substantially parallel to said single edge.

3. The pad according to claim 1, wherein each sheet of the plurality of sheets is provided with a score line proximate the region of the single edge, thereby facilitating the separation of each sheet from the pad of a plurality of sheets.

4. The pad according to claim 3, wherein a plurality of staples are applied to the pad of a plurality of sheets.

5. The pad according to claim 3, wherein each sheet of the plurality of sheets is provided with a score line proximate a region formed by the at least one staple, thereby facilitating the separation of each sheet from the pad of a plurality of sheets.

6. The pad according to claim 1, wherein at least one staple is applied to the pad of a plurality of sheets.

7. The pad according to claim 1, wherein a releasable adhesive is applied to each sheet in the region of the single edge.

8. The pad according to claim 1, wherein an adhesive is applied to each sheet in the region of the single edge thereby binding together the plurality of sheets of expandable paper.

9. The pad according to claim 8, wherein each sheet of the plurality of sheets is provided with a score line proximate the region of the adhesive, thereby facilitating the separation of each sheet from the pad of a plurality of sheets.

10. The pad according to claim 1, wherein a support sheet is provided below the bottom sheet of the plurality of sheets.

11. The pad according to claim 10, wherein the support sheet is provided with a plurality of adhesive strips placed under and attached to the support sheet for adhering the pad to a supporting surface.

12. The pad according to claim 11, further including at least one release sheet applied to the exposed the adhesive strips.

13. The pad according to claim 10, wherein the support sheet is a paper board sheet.

14. The pad according to claim 13, wherein said paper board sheet is stiff or rigid.

15. The pad according to claim 10, wherein the support sheet is a chipboard sheet.

16. The pad according to claim 1, wherein the slit sheet paper is a Kraft paper in the range from about 40# to 60#.

17. The pad according to claim 16, wherein the slit sheet paper has a slit pattern in the range from of approximately 0.45" slit length, 0.17" land length between ends of slits, and 0.11" row width between slits to approximately 0.40" slit length, 0.15" land length between ends of slits, and 0.1000" row width between slits.

18. The pad according to claim 1, wherein the slit sheet paper has a slit pattern in the range from of approximately 0.45" slit length, 0.17" land length between ends of slits, and 0.11" row width between slits to approximately 0.40" slit length, 0.15" land length between ends of slits, and 0.1000" row width between slits.

19. The pad according to claim 1, wherein the slit sheet paper has a slit pattern with slits each having a length of 0.45" or less.

20. The pad according to claim 1, wherein the slit sheet paper has a slit pattern with slits each having a length of 0.40" or less.

21. The pad according to claim 1, wherein the pad of a plurality of sheets of expandable slit paper is rolled to form a generally cylindrical configuration.

22. The pad according to claim 1, wherein the pad of a plurality of sheets of expandable slit paper is rolled to form a roll of sheets of expandable slit paper.

23. The pad according to claim 1, wherein said expandable slit paper is an extensible paper having an extensibility in a machine direction of at least 5%.

24. The pad according to claim 23, wherein said expandable slit paper is an extensible paper having an extensibility in a cross direction of at least 5%.

25. The pad according to claim 1, wherein said expandable slit paper is an extensible paper having an extensibility in a cross direction of at least 5%.

26. A method, comprising:
a) providing a pad, including:
a plurality of sheets of expandable slit paper,
said paper expanding in thickness when stretched to form expanded cells,
wherein the sheets of expandable slit paper are bound together along a single edge and otherwise unbound together;
wherein each of said plurality of sheets of expandable slit paper includes an array of slits that form said expanded cells when the respective sheet is manually pulled away from said single edge along a plane of the respective sheet;

b) having the user manually grasp a top sheet of said plurality of sheets and pull the top sheet in a direction away from said single edge so as to cause said top sheet to expand to form a plurality of expanded cells; and c) having the user wrap the expanded top sheet around an item.

27. The method of claim 26, further including:

a) having the user wrap the expanded top sheet around the item while the top sheet remains bound at said single edge, whereby the top sheet is maintained in an expanded state during wrapping; and b) having the user separate the expanded top sheet from being bound at said single edge after wrapping of the item.

28. The method of claim 26, further including having the user place the wrapped item within a package or box.

29. The method of claim 26, further including providing said slit sheet paper from an extensible paper.

30. The method of claim 29, wherein said extensible paper has an extensibility in a machine direction of at least 5%.

31. The method of claim 29, wherein said extensible paper has an extensibility in a cross direction of at least 5%.

32. The method of claim 29, wherein said extensible paper has an extensibility in a machine direction of at least 5% and an extensibility in a cross direction of at least 5%.

33. A method, comprising:

a) providing a pad including;

a plurality of sheets of expandable slit paper, said paper expanding in thickness when stretched to form expanded cells, wherein the sheets of expandable slit paper are bound together along a single edge and otherwise unbound together, and b) having a user manually grasp a top sheet of said plurality of sheets and pull the top sheet in a direction away from said single edge so as to cause said top sheet to expand to form a plurality of expanded cells, c) prior to separating said top sheet from said pad, having the user wrap the expanded top sheet around an item, and d) having the user separate said top sheet from said pad after wrapping the expanded top sheet around an item.

* * * * *